(No Model.)
F. SALATHE.
PIGMENT VEHICLE AND METHOD OF PRODUCING SAME.
No. 547,294.  Patented Oct. 1, 1895.
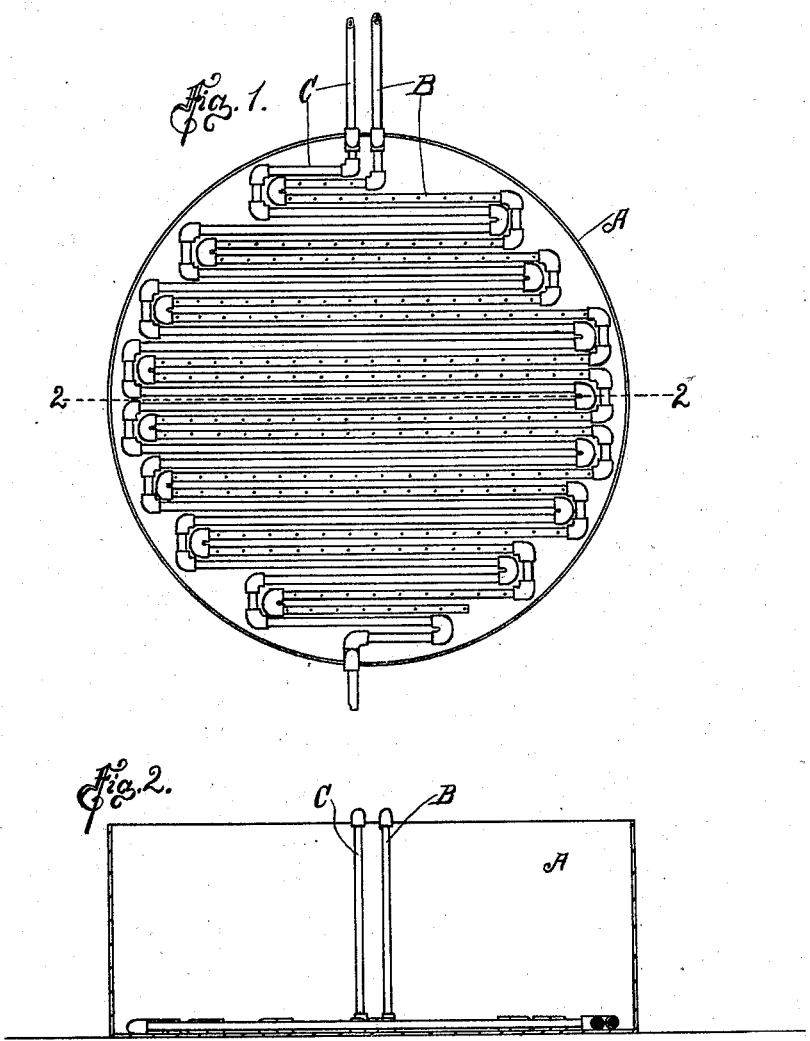

UNITED STATES PATENT OFFICE.

FREDERICK SALATHE, OF SANTA PAULA, CALIFORNIA, ASSIGNOR TO THE UNION OIL COMPANY OF CALIFORNIA, OF SAME PLACE.

PIGMENT VEHICLE AND METHOD OF PRODUCING SAME.

SPECIFICATION forming part of Letters Patent No. 547,294, dated October 1, 1895.

Application filed February 19, 1894. Serial No. 500,718. (No specimens.)

*To all whom it may concern:*

Be it known that I, FREDERICK SALATHE, a citizen of the United States, formerly residing at Jersey City, New Jersey, and New York city, New York, now residing at Santa Paula, in the county of Ventura, State of California, have invented a new and useful Composition of Matter Suitable for Pigment Vehicles and Like Purposes and a Method of Producing the Same, of which the following is a specification.

My invention relates to the manufacture from bitumens of a product which is adapted for use as a substitute for linseed-oil and other oils having oxidizing and drying qualities. It also includes said product or pigment vehicle.

The object of my invention is to produce and provide from bitumens a material which can be practically and economically applied to various uses in the mechanical arts to which linseed-oil and other oils capable of oxidizing and drying can be applied.

My new composition of matter consists in the oxidized special fraction of bitumens convertible into asphaltum, as hereinafter more particularly defined. This product is distinctively new in its chemical and physical qualities.

Attempts have heretofore been made to produce drying-oils from petroleums of the paraffine series, but such attempts have been unsuccessful. My invention relates to the production of an oil which has superior penetrating qualities and can be used in larger or smaller proportion as a substitute for linseed-oil in the preparation of paints and varnishes.

The preparation from paraffine-oils of a substitute for drying-oils similar to the one above described has been found to be impracticable, for the reason that paraffine-oils are not oxidizable, from the fact that oxygen cannot be substituted for hydrogen in the paraffine-oils. In these drying-oils oxygen is substituted in the molecule of the oil for hydrogen; but in attempting to oxidize the paraffine-oils the oils are consumed instead of forming the substitution compound.

In order that my invention may be understood by those versed in the technology and chemistry of bitumens, I will first premise that the bitumens found in Southern California, particularly in Ventura county, are specifically different from those bitumens which are found east of the Mississippi river and known as "paraffine-petroleums." These California bitumens, when subjected to distillation, produce distillates which, as they flow from the still, are colorless or are of pale yellow or brown color, but which, after a few hours standing, change in color to very much darker shades and range from the lightest through pale brown to black. The particular fraction or portion under consideration with relation to the subject-matter of this patent is when it first appears from the condenser of a pale-yellow color or almost colorless, and the same oil after standing for a few hours will become of a muddy black or dark-brown color, but when subjected to the ordinary process of treatment with acid and alkali familiar to every refiner of petroleums it becomes of a dark cherry-red color. After such treatment the oil may be kept for any length of time and its red color will remain as described until the oil is oxidized. In the present condition of research it is impossible for me to define the product which I herein claim as my invention further than by certain physical characteristics which I will hereinafter set forth and the further fact that it is the product resulting from the oxidation of said special fraction, but such definition is so clear and exact that anyone versed in the art will readily distinguish the new product by said definition.

The terms "asphalt" and "asphaltum" have loosely been used heretofore to designate various unlike substances, embracing, in addition to the solid forms of bitumen as they occur in nature, a variety of solid residuums resulting from the distillation of bitumens and unlike the asphaltum which is produced by natural causes. The various substances which have thus been loosely termed "asphalt" or "asphaltum" are unlike each other and also collectively unlike the natural asphalts. The use of the words "asphaltum" and "asphalt" in this application for patent is to be understood to apply only to those bitumens which are included in the proper definition of the terms "asphalt" and "asphaltum"—viz., the solid forms of bitumen occurring in nature.

My new product is manufactured from those oils found in Ventura county, California, and defined as petroleums convertible by natural or artificial means into asphaltum. The practical fraction for use in making my new composition of matter can be separated on the first distillation of the crude oil; but it is preferable to do it on the redistillation of the first distillate. No designation can be made of the exact specific gravity of this distillate. It is a distillation obtained from oxidizable petroleums convertible into asphaltum that is found upon trial and experiment to be susceptible of oxidation to such a degree as to serve the purpose. This can be determined at the end of the oxidizing operation by the very much increased viscosity of the oil and the change in the color from dark-red to black and the loss of transparency, except when the oil is spread very thin. As obtained from the oils produced in the neighborhood of Santa Paula, California, this distillate comes out below the so-called 26° gravity oil (at which the 28° gravity distillate is cut off) and the lubricating distillates. It is, after the ordinary treatment with acid and alkali, a dark cherry-red oil having a specific gravity of 24° Baumé, more or less, and found as a light-yellow oil as it comes from the condenser, from among those distillates having a specific gravity from 22° to 25° Baumé, the same under oxidation becoming more viscous, changing its color from red to black, and losing its transparency after the manner similar to the effect produced by boiling linseed-oil. The specific gravity must not be limited to 24°, as with different crude petroleums, either lighter or heavier than the average now used at Santa Paula, this distillate suitable for this purpose might be either heavier or lighter than 24°. A distinguishing characteristic of this treated distillate for this purpose is its susceptibility to oxidation, thereby becoming very viscous and the color changing from red to black and losing its transparency, after a manner similar to the effect produced by boiling linseed-oil. It thickens. Practically some of the distillates won't thicken at all, but this fraction will thicken, and under the action of the oxidizing agents becomes a viscous, black, turbid oil, somewhat of the consistency of thin varnish.

The accompanying drawings illustrate apparatus suitable for use in producing my new vehicle.

Figure 1 is a plan view of said apparatus. Fig. 2 is a vertical mid-section on line 2 2, Fig. 1.

A is a tank provided with an air-injector B and a steam-coil C.

I will describe the production of my new pigment vehicle as practically carried on by me.

The said special fraction is first separated as above indicated and is then treated in the ordinary way with the acid and alkali treatment.

In preparing the treated distillate for the preparation of my new product eight barrels of the said distillate are put into the tank A, provided with the steam-coil C, for heating, and with the air-injector B, and heated to 210° Fahrenheit. A jet of air is then injected, which causes violent ebullition of the oil with rapid expulsion of the moisture within the oil, and as the oil becomes a little hotter (heated to 215° Fahrenheit) the air passing through appears to oxidize the oil and burn out a portion of the hydrogen, so that steam escapes from the surface. When the oil reaches a temperature of 215° Fahrenheit, binoxide of manganese is added in the proportion of two ounces to a barrel of oil, and dry borate of manganese in the proportion of one-half an ounce to the barrel of oil. The borate of manganese is a very light powder and should be carefully rubbed with a portion of the oil until the mixture is smooth and then added in small portions at a time. The binoxide of manganese, being heavier and in very fine powder, is sifted into the oil. After these two substances are added to the oil, the oil is agitated by a current of air from the injector for two hours, more or less. At the end of the operation the viscosity of the oil is greatly increased, the color changed from red to black, and it is no longer transparent.

On cooling, the small quantity of sediment resulting from the addition of the chemicals subsides and the oil is pumped off into a storage-tank.

It is to be understood that while the above is a detailed account of the method preferably employed to form the new product I do not limit my claim strictly to the details given.

The oxidation may be effected by means of any suitable oxidizing agents, such as a current of hot air alone, if sufficient time is taken, or by a current of hot air in the presence of any equivalent metallic oxides or peroxides. For example, the oxalate of manganese (a combination of oxalic acid) or other oxides of manganese, (including also the peroxides,) or the salts of chromic acid, or the oxides or peroxide of lead, or the peroxide of barium or sodium. All these act as oxidizing agents, giving off oxygen to the oil. Another agent which may be used is hydrogen peroxide.

The oxidizing operation continues from two to six hours, according to the temperature and agents used. To accomplish the result by using a hot-air blast, without other oxidizing agents, the operation would require from ten to twelve hours. The proportion of the oxidizing agents is from one one-hundredth of one per cent. to five per cent. of the oil, by weight, the latter being the extreme quantity. The specific chemical composition of the fraction suitable for this purpose has not yet been determined. The research necessary for this purpose requires more time than it has thus far been possible to devote to it. I have therefore referred the characteristics of the oil as ascertained by an experimental determination of its fitness for the purpose, this being, in the event of more detailed knowledge concerning the fraction, the most rapid and practical method of determination. In consequence of the difficulty of assigning any elementary formula to this new product it has been defined by describing its constituents.

Now, having described my invention, what I claim as new, and desire to secure by Letters Patent, is—

1. The method set forth of producing a pigment vehicle consisting as specified in distilling and separating from the distillate of bitumen convertible into asphaltum that portion or special fraction which upon trial, is found to be susceptible of oxidation, which portion after the ordinary acid and alkali treatment is a dark red oil having a specific gravity of about 24° Baumé, more or less and found among those distillates having a specific gravity from 22° to 25° Baumé, the same under oxidation becoming more viscous and changing in color from red to black and losing its transparency after the manner similar to the effect produced by boiling linseed oil; treating said special fraction with acid and alkali; and oxidizing such treated special fraction substantially as set forth.

2. The method set forth of producing a pigment vehicle consisting as specified in distilling and separating from bitumen convertible into asphaltum that portion or special fraction which upon trial is found to be susceptible of oxidation, and which portion, after the ordinary acid and alkali treatment, is a dark red oil having a specific gravity of about 24° Baumé, more or less, and found among those distillates having a specific gravity from 22° to 25° Baumé, the same under oxidation becoming more viscous and changing in color from red to black and losing its transparency after the manner similar to the effect produced by boiling linseed oil, treating said special fraction with acid and alkali, heating the distillate to about 210° Fahrenheit; injecting air into the oil thereby expelling the moisture within the oil; heating the oil to about 215° Fahrenheit, then adding binoxide of manganese in the proportion of about two ounces to a barrel of oil and dry borate of manganese in the proportion of about half an ounce to a barrel of oil; continuing the injection of air for about two hours more or less until the viscosity of the oil is greatly increased and the color changed from red to black, and the oil is no longer transparent.

3. The pigment vehicle consisting in the viscous black turbid oil set forth which in the present condition of research is particularly defined as to the oxidized portion or special fraction of the distillate of bitumen convertible into asphaltum, which special fraction or distillate, after the acid and alkali treatment, before oxidation, is a dark cherry red oil having a specific gravity of about 24° Baumé, more or less, and which distillate is found, as a pale yellow or almost colorless oil, among those distillates having a specific gravity from 22° to 25° Baumé; and which vehicle is more viscous than said treated distillate, and is further characterized by the fact of having lost the transparency of said treated distillate, and further by the fact that its color has changed from red to black under the process of oxidation.

FREDERICK SALATHE.

Witnesses:
STEPHEN F. PECKHAM,
JAMES R. TOWNSEND,
R. W. CLARK,
ALEX. WALDIE.